United States Patent
Bak et al.

(10) Patent No.: US 8,597,809 B2
(45) Date of Patent: Dec. 3, 2013

(54) RECHARGEABLE BATTERY

(75) Inventors: Hyo-Rim Bak, Yongin-si (KR); June-Hyoung Park, Yongin-si (KR)

(73) Assignee: Samsung SDI Co., Ltd. (KR)

( * ) Notice: Subject to any disclaimer, the term of this patent is extended or adjusted under 35 U.S.C. 154(b) by 189 days.

(21) Appl. No.: 12/957,314

(22) Filed: Nov. 30, 2010

(65) Prior Publication Data

US 2011/0200854 A1    Aug. 18, 2011

Related U.S. Application Data

(60) Provisional application No. 61/305,906, filed on Feb. 18, 2010.

(51) Int. Cl.
*H01M 2/12* (2006.01)
*H01M 2/04* (2006.01)

(52) U.S. Cl.
USPC .......................................... 429/56; 429/185

(58) Field of Classification Search
USPC ................................................ 429/56, 185
See application file for complete search history.

(56) References Cited

U.S. PATENT DOCUMENTS

| | | | |
|---|---|---|---|
| 4,722,874 A | 2/1988 | Marchak | |
| 5,595,835 A | 1/1997 | Miyamoto et al. | |
| 6,531,242 B1 * | 3/2003 | Sugimoto et al. | 429/82 |
| 7,648,794 B2 | 1/2010 | Kim et al. | |
| 8,076,015 B2 | 12/2011 | Bouffard | |
| 8,236,438 B2 | 8/2012 | Meguro et al. | |
| 2004/0157115 A1* | 8/2004 | Bouffard et al. | 429/56 |
| 2007/0154782 A1 | 7/2007 | Cho et al. | |

FOREIGN PATENT DOCUMENTS

| | | |
|---|---|---|
| JP | 63-94555 A | 4/1988 |
| JP | 10-214608 A | 8/1998 |
| JP | 11-073834 A | 3/1999 |
| JP | 11-073934 A | 3/1999 |
| JP | 2006-517724 A | 7/2006 |
| JP | 2009-272085 A | 11/2009 |
| KR | 10-2000-0014825 | 3/2000 |
| KR | 10-2006-0028183 | 3/2006 |
| KR | 10-2007-0071232 | 7/2007 |
| KR | 10-2008-0036740 | 4/2008 |
| KR | 10-2008-0099449 | 11/2008 |
| KR | 10-2009-0021482 | 3/2009 |
| WO | WO 01/37355 A1 | 5/2001 |

OTHER PUBLICATIONS

Office Action dated Feb. 26, 2013, issued in connection with Japanese Patent Application No. 2011-025878.

Extended European Search Report received in connection with European Patent Application No. 10193866.0.

(Continued)

*Primary Examiner* — Gregg Cantelmo
(74) *Attorney, Agent, or Firm* — Knobbe Martens Olson & Bear, LLP

(57) ABSTRACT

A rechargeable battery according to an embodiment of the present invention includes: an electrode assembly; a battery case accommodating the electrode assembly; and a cap assembly comprising: a cap plate comprising a top portion and at least one opening; and a vent member comprising two or more notches and a supporting portion, wherein the vent member is configured to break at the two or more notches and bend along two or more lines adjacent to the supporting portion.

18 Claims, 7 Drawing Sheets

(56) References Cited

OTHER PUBLICATIONS

Office Action dated Apr. 11, 2013, issued in connection with Chinese Patent Application No. 201110043958.5.

Japanese Notice of Allowance dated Sep. 24, 2013, issued in connection with corresponding Japanese Patent Application No. 2011-025878.

* cited by examiner

RECHARGEABLE BATTERY

CROSS-REFERENCE TO RELATED APPLICATIONS

This application claims priority to and the benefit of U.S. Provisional Application No. 61/305,906 filed on Feb. 18, 2010 in the U.S. Patent and Trademark Office, the entire content of which is incorporated herein by reference.

BACKGROUND

1. Field

Embodiments of the present invention relate to a rechargeable battery, more particularly, to a rechargeable battery with an improved vent member.

2. Description of the Related Technology

A rechargeable battery is a battery that is chargeable and dischargeable, unlike primary batteries that cannot be recharged. A low-capacity rechargeable battery is typically been used for small portable electronic devices, such as mobile phones, laptop computers, and camcorders, and a large-capacity rechargeable battery is typically used as a power supply for driving motors, such as in hybrid vehicles, etc., or a large-capacity power storage device.

Recently, high output rechargeable batteries using non-aqueous electrolytes with high energy density have been developed and such high power rechargeable batteries are configured of large-capacity battery modules by connecting a plurality of rechargeable batteries in series so that they can be used, for example, to drive motors for electric vehicles, etc. The rechargeable battery may be formed of a cylindrical type, a square type, etc.

While the rechargeable battery repeats charging and discharging, gas can be generated in the rechargeable battery to increase the pressure therein. When the increase in pressure of the rechargeable battery is not handled properly, there is a risk that the rechargeable battery may explode.

The above information is only presented for enhancement of understanding of the background of the invention and may contain information that does not form the prior art.

SUMMARY

An embodiment of the present invention provides a rechargeable battery including: an electrode assembly; a battery case accommodating the electrode assembly; and a cap assembly comprising: a cap plate comprising a top portion and at least one opening; and a vent member comprising two or more notches and a supporting portion, wherein the vent member is configured to break at the two or more notches and bend along two or more lines adjacent to the supporting portion.

DETAILED DESCRIPTION OF THE EMBODIMENTS

Figure 1:
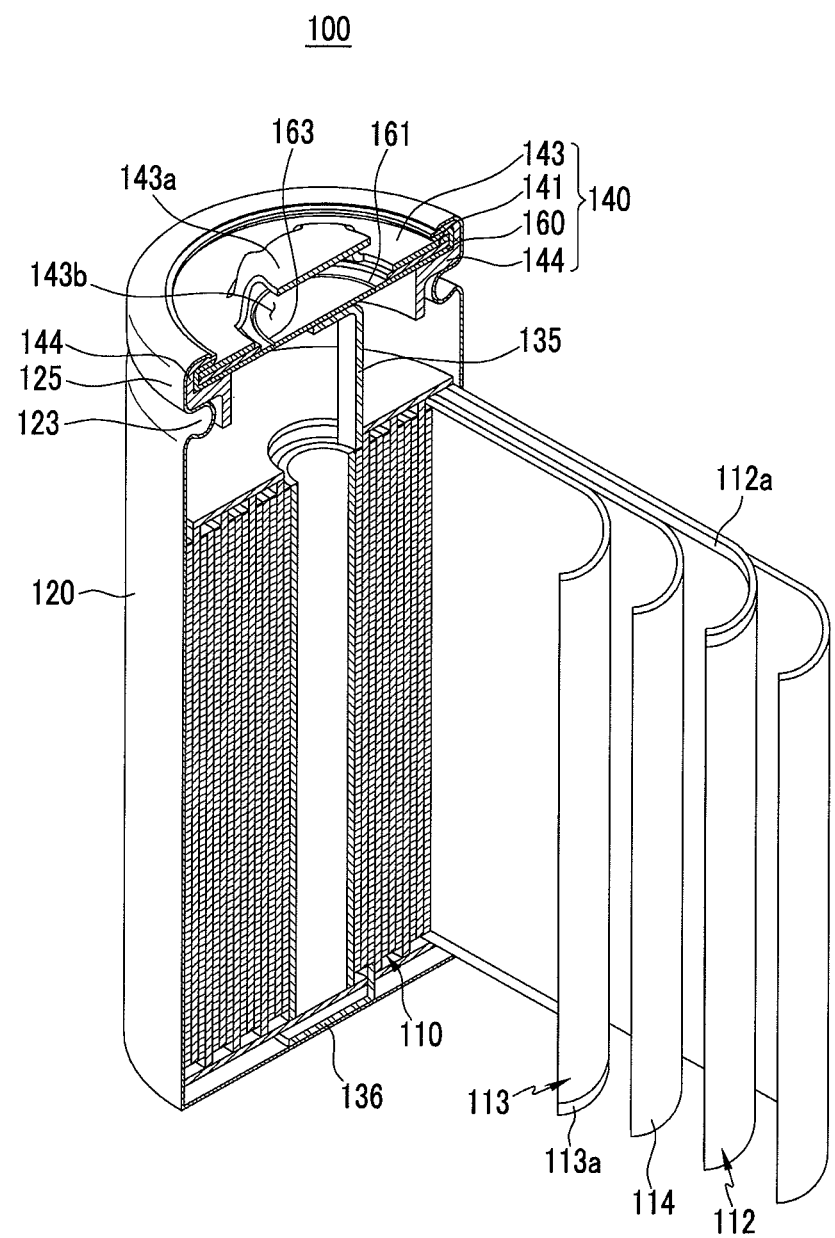
FIG. 1 is a cut perspective view showing a rechargeable battery according to a first embodiment of the present invention.

Hereinafter, embodiments of the present invention will be described in detail with reference to the accompanying drawings. As those skilled in the art would realize, the described embodiments may be modified in various different ways, all without departing from the spirit or scope of the present invention. Like reference numerals designate like elements in the specification and drawings.

FIG. 1 is a cut perspective view showing a rechargeable battery according to an embodiment of the present invention.

Referring to FIG. 1, a rechargeable battery 100 according to an embodiment includes an electrode assembly 110 where an anode 112 and a cathode 113 are positioned, a separator 114 therebetween and a case 120 whose one end is opened so that it can receive the electrode assembly 110 with an electrolyte. The opening of the case 120 is installed with a cap assembly 140 that seals the case 120.

In detail, case 120 may be made of a conductive metal, such as aluminum, aluminum alloy, or nickel-plated steel. A shape of the case 120 according to the present embodiment may be configured to be of a cylindrical type having an inner space in which the electrode assembly 110 is positioned. The cap assembly 140 may be inserted into the case 120 and then be clamped to fix the cap assembly 140 to the case 120. In this process, the case 120 may be formed with a beading portion 123 and a clamping portion 125.

The electrode assembly 110 according to the present embodiment may be configured of a cylindrical type wound like a vortex after the anode 112, the separator 114, and the cathode 113 are stacked, but the structure of the electrode assembly 110 is not necessarily limited thereto but can be formed to have a different structure. The anode 112, the cathode 113, and the separator 114 may be formed in a strip shape that is connected in one direction.

The anode 112 may include an anode active material layer that is formed on an anode current collector and both sides of the anode current collector and a cathode 113 may include a cathode current collector and a cathode active material layer that is formed on both sides of the cathode current collector. The separator 114 may be inserted between the anode 112 and the cathode 113 to insulate the anode 112 and the cathode 113 and to provide a passage through which ions move.

An upper end of the anode 112 may be formed with an anode non-coated portion 112a on which the anode active material is not formed, and a lower end of the cathode 113 may be formed with a cathode non-coated portion 113a on which the cathode active material layer is not formed. The present embodiment illustrates a case in which the anode non-coated portion 112a and the cathode non-coated portion 113a are formed on the upper end and the lower end of the electrode assembly 110, respectively, but embodiments of the present invention are not limited thereto. The anode non-coated portion 112a may be formed at one end of the anode 112 in the length direction and the cathode non-coated portion 113a may be formed at the other end of the cathode 113 in the length direction.

The cap assembly 140 may include the cap plate 143, a gasket 144 that is adjacently disposed to the case 120 and winds the vent member 160 installed below the cap plate 143 and the cap plate 143, and a safety plate 141 disposed between the cap assembly 140 and the vent member 160.

The cap plate 143 may be formed with an upwardly protruded protrusion 143a and a penetrated exhaust port 143b, and the vent member 160 may be formed with notches 161 and 163 fractured at the set pressure condition. A safety plate 141 that electrically connects the cap plate 143 and the vent member 160 may be installed between the cap plate 143 and the vent member 160. The safety plate 141 may be configured of a positive temperature coefficient element and an element that increases the electric resistance approximately up to infinity when the positive temperature coefficient element exceeds a predetermined temperature. The safety plate 141 may perform a role of blocking the flow of charging and discharging current when the rechargeable battery 100 exceeds a temperature of the predetermined value.

The gasket 144 may be installed to the circumference of the cap plate 143, the safety plate 141, the vent member 160 and insulate the cap assembly 140 from the case 120.

The anode 112 may be electrically connected to the vent member 160 via the anode current collecting tap 135 and the cathode 113 may be electrically connected to the bottom of the case 120 via the cathode current collecting tap 136. The present embodiment illustrates the case in which the anode current collecting tap 135 is directly connected to the vent member 160, but embodiments of the present invention are not limited thereto. The intermediate member of the vent member 160 may be installed such that the vent member 160 and the anode current collecting tap 135 may be connected via the intermediate member.

Figure 2A:
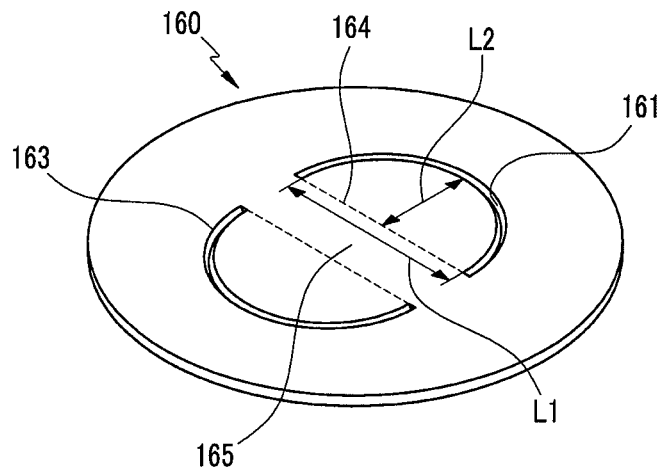
FIG. 2A is a perspective view showing a vent member of a rechargeable battery according to the first embodiment of the present invention.
Figure 2B:
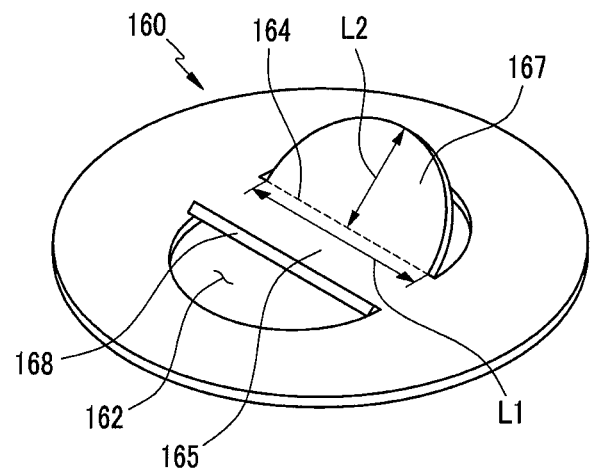
FIG. 2B is a perspective view showing a state where a notch of a vent member shown in FIG. 2A is fractured and opened.
Figure 2C:
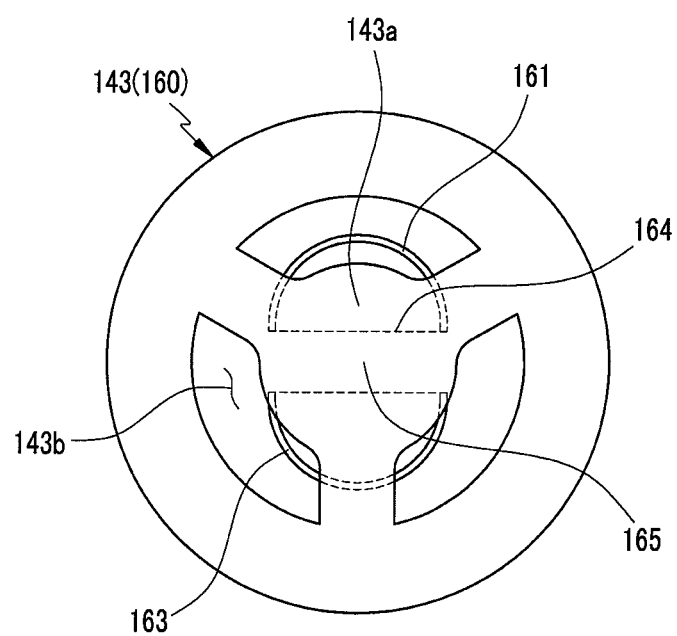
FIG. 2C is a plan view showing the relationship between a vent member and a cap plate of a rechargeable battery according to the first embodiment of the present invention.

FIG. 2A is a perspective view showing the vent member according to the first illustrated embodiment of the present invention and FIG. 2B is a perspective view showing the state where the notch of the vent member shown in FIG. 2A is fractured and opened, and FIG. 2C is a plan view showing the relationship between the vent member and a cap plate of the rechargeable battery according to the first embodiment of the present invention.

Referring to FIGS. 2A, 2B and 2C, the vent member 160 according to the present illustrated embodiment is formed with the first notch 161 and the second notch 163, and each of the notches 161 and 163 may be formed of a line segment having an arc shape. The present illustrated embodiment illustrates the case where the notches 161 and 163 are formed to have an arc shape but embodiments of the present invention are not limited thereto. The notch can be formed in various shapes, such as a triangle, a quadrangle, etc. The first notch 161 and the second notch 163 according to the present embodiment is formed of a semicircular type, and the first notch 161 and the second notch 163 are disposed to be spaced from each other. A supporting portion 165 may be formed between the bent lines 164 that connect both ends of each notch 161 and 163. The supporting portion 165 may perform a role of separating an opening 162 where the notches 161 and 163 may be formed to be fractured. The first notch 161 and the second notch 163 may be symmetrical such that the supporting portion 165 is provided therebetween.

The notches 161 and 163 may be formed to be in a line that is convexly protruded toward the outside of the vent member 160 from the bent line 164. A first fracture piece 167 that is bent and raised at the time of fracturing the first notch 161 may be positioned between the first notch 161 and the supporting portion 165, and a second fracture piece 168 that is bent and raised at the time of fracturing the second notch 163 may be positioned between the second notch 163 and the supporting portion 165.

The second notch may be formed of the same as the first notch and therefore, the description of the second notch will be described as the description of the first notch.

Referring to FIG. 2C, the supporting portion 165 is under the protrusion 143a of the cap plate 143 and does not extend beyond the protrusion 143a of the cap plate 143. That is, when viewed in the plan view, the bent lines 164 and the supporting portion 165 are inside the protrusion 143a.

If the bent lines 164 are not inside the protrusion 143a, a portion of the supporting portion 165 positioned outside the protrusion 143a blocks the passage to the exhaust port 143b when the vent member 160 is opened. Since the bent lines 164 in the present embodiment are inside the protrusion 143a, the supporting portion 165 does not block the passage to the exhaust port 143b and the first and second fracture pieces 167 and 168 guide the gas discharged through the opening 162 to the exhaust port 143b.

Figure 3:
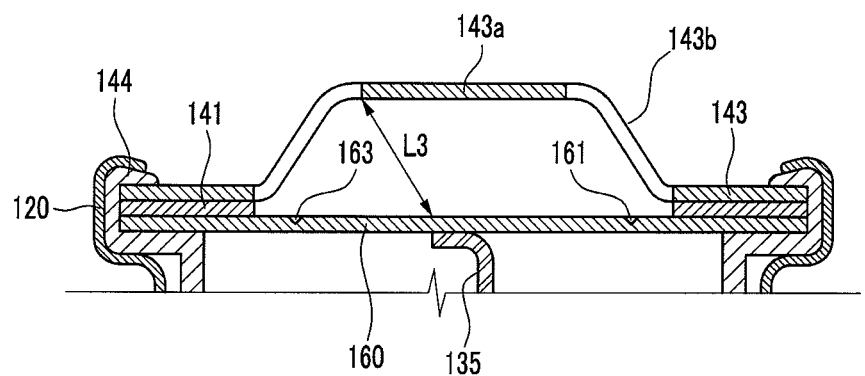
FIG. 3 is a partial cross-sectional view of a rechargeable battery according to the first embodiment of the present invention.
Figure 4:
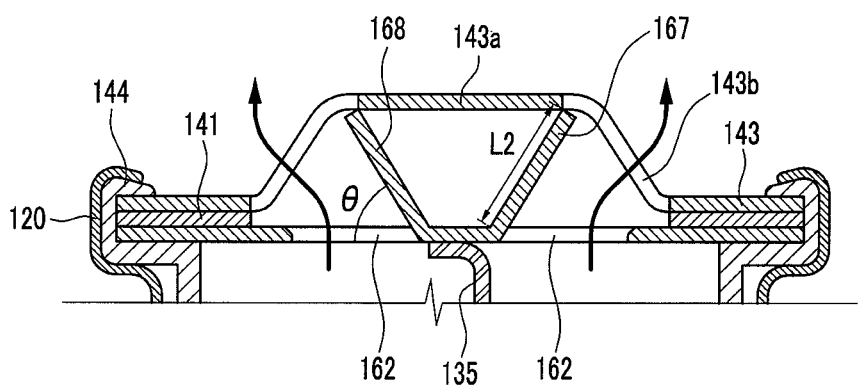
FIG. 4 is a partial cross-sectional view showing a state where the notch of the vent member of FIG. 3 is fractured and opened.

As shown in FIGS. 3 and 4, when the maximum distance from the bent line 164 to the first notch 161 is referred to as a long width L2, the long width L2 of the first notch 161 according to the present illustrated embodiment may be formed of the same distance as the distance L3 from the bent line 164 to the upper end of the exhaust port 143b that is formed in the cap plate 143. Therefore, as shown in FIG. 4, when the internal pressure of the rechargeable battery is raised to break the first notch 161, the upper end of the first fracture piece 167 may contact the inside end of the exhaust port 143b to sufficiently secure the passage through which gas moves. However, embodiments of the present invention are not limited thereto and the long width L2 may be formed to be smaller than the distance L3 from the bent line 164 to the upper end of the exhaust port 143b.

In addition, since the notches 161 and 163 may be formed to have a predetermined space therebetween while positioning the supporting portion 165 therebetween, each notch 161 and 163 can be easily fractured without each of the notches 161 and 163 interfering with each other when being fractured, such that the opening 162 is formed at two places.

In addition, since the first notch 161 is convexly formed toward the outside of the vent member 160 with respect to the bent line 164, when the first notch 161 is fractured such that the first fracture piece 167 is raised, the first fracture piece 167 is not positioned between the exhaust port 143b and the opening 162 that is formed by the fracture of the first notch 161 and is positioned near the opening 162 and the exhaust port 143b. In other words, in reference to the drawing, it can be appreciated that the lower end of the first fracture piece 167 may contact the inner side end of the opening 162 and the upper end of the first fracture piece 167 may also contact the inner side end of the exhaust port 143b. At this time, the inner side may be inwardly positioned based on the center of the vent member 160. Therefore, since gas discharged through the opening 162 can move the exhaust port 143b using the guide of the first fracture piece 167, gas can be discharged more rapidly. However, when the first notch 161 is positioned more inwardly than the bent line 164 and the exhaust port 143b is spaced from the center of the cap plate 143 and is disposed in a circumferential direction, since the first fracture piece 167 is positioned between the opening 162 and the exhaust port 143b, there may be a problem in that first fracture piece 167 prevents the progress of gas.

When the first notch 161 is determined by the rise of internal pressure, the first fracture piece 167 may be bent at an inclined angle of 30° to 90° with respect to the supporting portion 165 in the bent line 164. When the bending inclination of the first fracture piece 167 is smaller than 30°, there may be a problem in that the gas inside the rechargeable battery cannot be discharged rapidly, and when the bending inclination of the first fracture piece 167 is larger than 90°, a vortex may be generated at an area adjacent to the upper end of the first fracture piece 167 such that the discharge speed of gas is deteriorated. In other words, when the bending inclination of the first fracture piece 167 is larger than 90°, a reflowing phenomenon can occur by the introduction of gas in a reverse direction than the direction that discharges gas. Therefore, the discharge of gas may be delayed due to the reflowing gas.

The discharge speed of gas is very important in terms of safety of the rechargeable battery, and when the discharge speed of gas is delayed, there may be a serious problem in that the rechargeable battery explodes according to the conditions. Since the discharge of gas can be performed within a short time in a sudden situation, safety can be improved only in the case where gas needs to be rapidly discharged in a short time.

An experiment in which the battery module that includes 10 rechargeable batteries exploded under a situation using fire was tested. In the rechargeable battery of a comparative example in which one notch having a large semicircle is formed, four batteries exploded and 6 batteries became inflamed, while in the rechargeable battery according to the present embodiment, all 10 rechargeable batteries became inflamed but they did not explode. Through the above experiment, even in the scene of a fire or an abnormal situation where the temperature was very high, it could be appreciated that the rechargeable battery according to the present embodiment did not explode. The reason appears to be that before the rechargeable battery was able to explode, the vent member 160 was rapidly opened, thereby making it possible to rapidly discharge the internal gas to the ambient.

Figure 5A:
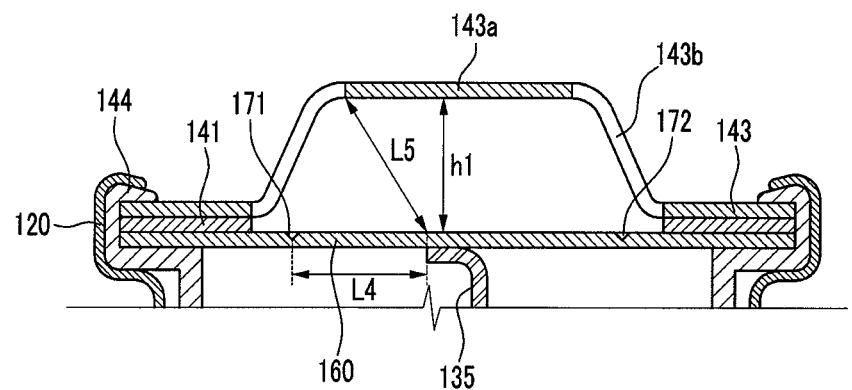
FIG. 5A is a partial cross-sectional view showing a rechargeable battery according to the second exemplary embodiment of the present invention.
Figure 5B:
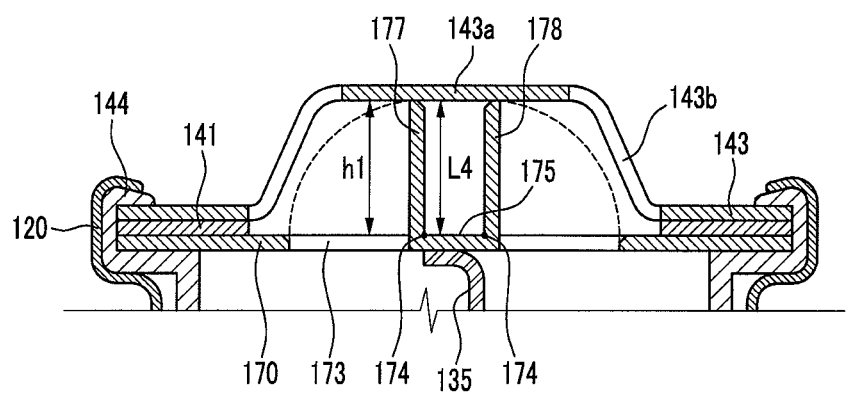
FIG. 5B is a partial cross-sectional view showing a state where the notch of the vent member of FIG. 5A is fractured and opened.

FIG. 5A is a partial cross-sectional view showing a rechargeable battery according to a second embodiment of the present invention and FIG. 5B is a partial cross-sectional view showing a state where the notch of the vent member of FIG. 5A is fractured and opened. Referring to FIGS. 5A and 5B, the rechargeable battery according to the present embodiment is configured to have the same structure as the rechargeable battery of to the first described embodiment except for the structure of the vent member 170, and thus, certain common descriptions thereof will not be repeated.

The vent member 170 may be formed with the first notch 171 and the second notch 172 having an arc type formed to be spaced, putting the supporting portion 175 therebetween, similar to the first described embodiment. The first notch 171 and the second notch 172 may be formed to be symmetrical with respect to the position of the supporting portion 175, and the line segment that connects both ends of the first notch 171, and the line segment that connects both ends of the second notch 172, can become the bent line 174. When the internal pressure of the rechargeable battery is raised, the first notch 171 may be fractured such that the first fracture piece 177 is bent and raised at the bent line 174, and the second notch 172 may also be fractured such that the second fracture piece 178 is bent and raised at the bent line 174.

The vent member 170 according to the present embodiment may be formed so that a long width L4, that is the maximum distance from the bent line 174 to the first notch, may be smaller than a distance L5 from the bent line 174 to the inner side end of the exhaust port 143b, and may be larger than a distance h1 from the bent line 174 to the upper end of the cap plate 143. Thereby, the upper ends of the fracture pieces 177 and 178 may be positioned between the inner side end of the exhaust port 143b and the place just above the bent line 174, such that gas discharged through the opening 173 can be rapidly guided to the exhaust port 143b.

Figure 6A:
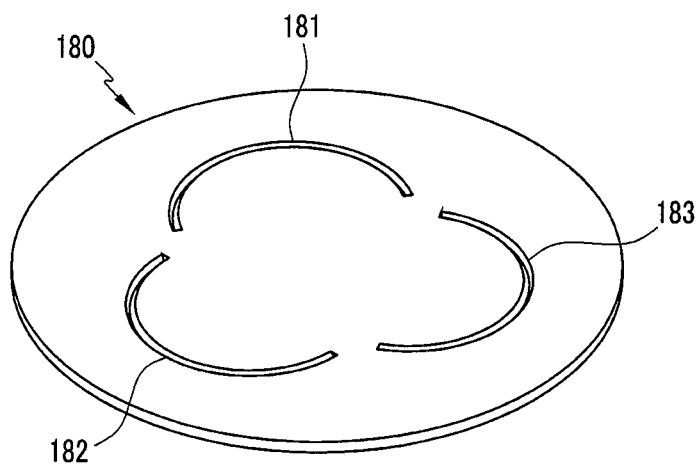
FIG. 6A is a perspective view showing a vent member of a rechargeable battery according to a third exemplary embodiment of the present invention.
Figure 6B:
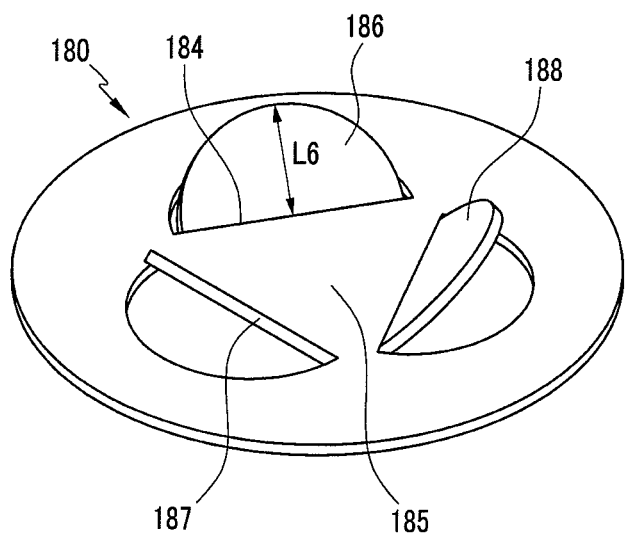
FIG. 6B is a perspective view showing a state where the notch of the vent member shown in FIG. 6A is fractured and opened.
Figure 7:
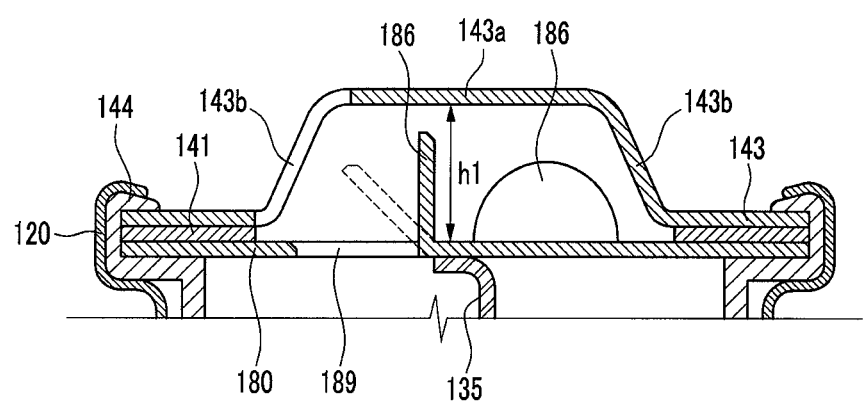
FIG. 7 is a partial cross-sectional view showing a rechargeable battery according to the third exemplary embodiment of the present invention.

FIG. 6A is a perspective view showing a vent member of a rechargeable battery according to a third embodiment of the present invention and FIG. 6B is a perspective view showing a state where the notch of the vent member shown in FIG. 6A is fractured and opened.

Referring to FIGS. 6A and 6B, the rechargeable battery according to the present embodiment is configured to have the same structure as the rechargeable battery according to the first described embodiment, except for a vent member 180 and thus, certain common description thereof will not be repeated.

The vent member 180 may be formed with a first notch 181 and a second notch 182, and a third notch 183. The notches 181, 182, and 183 may be disposed along the circumferential direction of the vent member 180 in equidistance and may be formed in a curved line that is convexly curved toward the outside of the vent member 180. A line segment that connects both ends of the notches 181, 182, and 183 may become a bent line 184. The cap plate 143 may be formed with three exhaust ports 143b and may be formed with three notches 181, 182, and 183 to correspond to the number of exhaust ports 143b. At this time, the notches 181, 182, and 183 may be disposed at the corresponding positions below each exhaust port. When the notches 181, 182, and 183 are fractured due to the increase in the internal pressure of the battery, a first fracture piece 186, a second fracture piece 187, and a third fracture piece 188 may be bent and raised at the bent line 184. A supporting portion 185 that supports the fracture pieces 186, 187, and 188 may be formed at the center of the vent member 180 among the notches 181, 182, and 183.

When the fracture pieces 186, 187, and 188 are raised, since the vent member 180 is formed with an opening 189, the opening may be positioned at the corresponding positions below the exhaust port. Thereby, gas discharged through each opening 189 can be rapidly discharged through the corresponding exhaust port 143b.

Since the second notch 182 and the third notch 183 are configured to have the same structure as the first notch 181 according to an embodiment, the description of the second notch 182 and the third notch 183 will not be repeated since the description of the first notch 181 is described above.

A width L6 that is the maximum distance from the bent line 184 to the first notch 181 may be formed to be smaller than the distance h1 from the bent line 184 to the upper end of the cap plate 143. Therefore, the fracture pieces 186, 187, and 188 can freely bend at any angle according to the fracture pressure but interfere with the adjacent fracture pieces 186, 187, and 188, thereby making it possible to prevent the fracture piece 186, 187, and 188 from excessively bending.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

We claim:

1. A rechargeable battery comprising:
an electrode assembly;
a battery case accommodating the electrode assembly; and
a cap assembly comprising:
  a cap plate comprising a top portion; and
  a vent member comprising two or more notches and a supporting portion, wherein the vent member is configured to break at the two or more notches and bend along two or more lines adjacent to the supporting portion forming at least two openings in the cap plate;
  wherein the vent member is configured to form at least one flap having a length at least twice its width when the vent is broken at at least one of the notches and bent along the at least one of the lines; and
  wherein the at least one flap comprises an edge that contacts an edge of the top portion of the cap plate at a point further from the center of the vent than the supporting portion;
  wherein the cap plate comprises at least two exhaust ports wherein each of the at least two openings in the cap plate correspond to a single one of the at least two exhaust ports.

2. The rechargeable battery of claim 1, wherein the supporting portion is between the notches and defined by the lines.

3. The rechargeable battery of claim 1, wherein at least a part of the supporting portion is under the top portion of the cap plate.

4. The rechargeable battery of claim 1, wherein the at least one flap comprises an edge that contacts a bottom surface of the top portion of the cap plate.

5. The rechargeable battery of claim 1, wherein the at least one flap comprises a length between the at least one line and the at least one notch that is substantially equal to a distance between the at least one line and an edge of the top portion.

6. The rechargeable battery of claim 1, wherein the at least one flap comprises a length that is the longest distance between the at least one line and the at least one notch and that is less than a distance between the at least one line and an edge of the top portion.

7. The rechargeable battery of claim 6, wherein the length is equal to or larger than a height between the vent member and the top portion of the cap plate.

8. The rechargeable battery of claim 1, wherein the at least one flap is configured to bend at an angle between 30° and 90° with respect to the vent member.

9. The rechargeable battery of claim 1, wherein the two or more notches are curved along a circumferential direction of the vent member.

10. The rechargeable battery of claim 9, wherein the supporting portion is an elongate portion disposed at a center of the vent member between the two or more notches.

11. The rechargeable battery of claim 9, further comprising three or more notches curved along a circumferential direction of the vent member, wherein the supporting portion is disposed centrally on the vent member with respect to the three or more notches.

12. The rechargeable battery of claim 11, wherein the three or more notches are substantially equidistant with respect to the supporting portion.

13. The rechargeable battery of claim 3, wherein the two or more lines have a length that is equal to or less than a length of the top portion of the cap plate.

14. The rechargeable battery of claim 1, wherein the vent member is configured to release gas from the electrode assembly through the at least one opening.

15. The rechargeable battery of claim 1, wherein the electrode assembly comprises an anode and a cathode, wherein one of the anode or the cathode is electrically connected to the vent member and the other of the anode or cathode is electrically connected to the bottom of the case.

16. A rechargeable battery comprising:
an electrode assembly;
a battery case accommodating the electrode assembly; and
a cap assembly comprising a lower plate having a plurality of notches, wherein the lower plate is configured to break at the notches and bend along lines that are centrally disposed with respect to the notches on the lower plate forming at least two openings in the cap plate;
  wherein the lower plate is configured to form at least one flap having a length at least twice its width when the lower plate is broken at least one of the notches and bent along the at least one of the lines; and
  wherein the at least one flap comprises an edge that contacts an edge of the top portion of the cap plate at a point further from the center of the vent than the supporting portion;
  wherein the cap plate comprises at least two exhaust ports wherein each of the at least two openings in the cap plate correspond to a single one of the at least two exhaust ports.

17. The rechargeable battery of claim 16, wherein the notches are curved along a circumferential direction of the lower plate.

18. The rechargeable battery of claim 16, wherein the flaps are configured to limit the bending of adjacent flaps.

* * * * *